United States Patent [19]

Mislin et al.

[11] 4,080,322
[45] Mar. 21, 1978

[54] 1-HYDROXY-2-ARYLAZO-8-HYDROCARBYLOXYCARBONYLAMINONAPHTHALENEDISULFONIC ACIDS

[75] Inventors: Roland Mislin, Saint Louis, France; Hanspeter Uehlinger, Basel, Switzerland

[73] Assignee: Sandoz Ltd., Basel, Switzerland

[21] Appl. No.: 697,402

[22] Filed: Jun. 18, 1976

Related U.S. Application Data

[63] Continuation of Ser. No. 471,936, May 21, 1974, abandoned, which is a continuation-in-part of Ser. No. 308,299, Nov. 20, 1972, abandoned.

[30] Foreign Application Priority Data

Nov. 24, 1971 Switzerland .............. 17127/71

[51] Int. Cl.$^2$ .............. C09B 29/30; C09B 43/12
[52] U.S. Cl. .............. 260/194; 260/198; 260/199
[58] Field of Search .............. 260/199, 194

[56] References Cited

U.S. PATENT DOCUMENTS

| | | | |
|---|---|---|---|
| 1,731,643 | 10/1929 | Wagner et al. | 260/199 |
| 2,276,174 | 3/1942 | Fleischhauer et al. | 260/199 |
| 2,714,590 | 8/1955 | Frisch et al. | 260/199 |
| 2,829,142 | 4/1958 | Conzetti et al. | 260/199 |

FOREIGN PATENT DOCUMENTS 779,615   7/1957   United Kingdom .............. 260/199

*Primary Examiner*—Charles F. Warren
*Attorney, Agent, or Firm*—Gerald S. Sharkin; Richard E. Vila; Melvyn M. Kassenoff

[57] ABSTRACT

Compounds of the formula

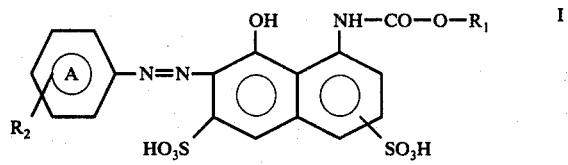

in which
- $R_1$ signifies an optionally substituted hydrocarbon radical,
- $R_2$ signifies hydrogen, halogen, nitro, a linear or branched optionally substituted alkyl radical such as haloalkyl, an optionally substituted cycloalkyl radical, alkoxy, alkylthio, an optionally substituted aryl radical, an acyl radical of an aliphatic or aromatic sulphonic or carboxylic acid, an ester or amide group of a sulphonic acid, an ester or amide group of a carboxylic acid, an ester group of a carbamic acid, unsubstituted or mono- or disubstituted amino or an acylamino group,
- the ring A may be further substituted, and may as $R_2$ bear a condensed cycloalkyl radical, but ring A and any substituent on it is free from carboxylic or sulphonic acid groups and from groups in the ortho-position to the azo group which are capable of the formation of metal complexes, provided that the total number of carbon atoms in $R_1$ and in the substituent(s) on ring A is from 12 to 30, preferably 12 to 18, in free acid or water-soluble salt form, are useful water-soluble dyes for acid-dyeable non-wovens and textile fibres, leather and paper.

34 Claims, No Drawings

1-HYDROXY-2-ARYLAZO-8-HYDROCARBYLOX-YCARBONYLAMINONAPHTHALENEDISULFONIC ACIDS

This application is a continuation of application Ser. No. 471,936, filed May 21, 1974 and now abandoned, which is a continuation-in-part of application Ser. No. 308,299, filed Nov. 20, 1972 and now abandoned.

The present invention relates to monoazo phenyl-azanaphthalenedisulfonic compounds.

The invention provides compounds of formula I,

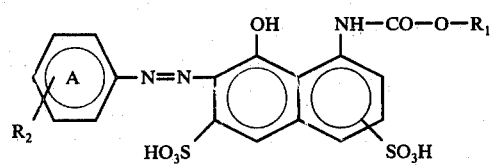   I in which
R₁ signifies an optionally substituted hydrocarbon radical,
R₂ signifies hydrogen, halogen, nitro, a linear or branched optionally substituted alkyl radical such as haloalkyl, an optionally substituted cycloalkyl radical, alkoxy, alkylthio, an optionally substituted aryl radical, an acyl radical of an aliphatic or aromatic sulphonic or carboxylic acid, an ester or amide group of a sulphonic acid, an ester or amide group of a carboxylic acid, an ester group of a carbamic acid, unsubstituted or mono- or disubstituted amino or an acylamino group,
the ring A may be further substituted, and may as R₂ bear a condensed cycloalkyl radical, but ring A and any substituent on it is free from carboxylic or sulphonic acid groups and from groups in the ortho-position to the azo group which are capable of the formation of metal complexes,
provided that the total number of carbon atoms in R₁ and in the substituent(s) on ring A is from 12 to 30, preferably 12 to 18, in free acid or water-soluble salt form.

The invention also provides processes for the production of compounds of formula I which comprise a. coupling in alkaline medium the diazo compound from an amine of formula II,

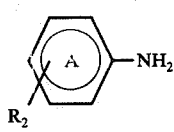   II in which R₂ and A are as defined above,
with a compound of formula III,

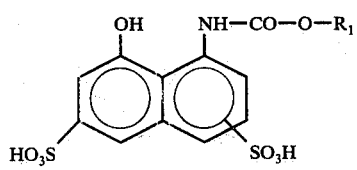   III in which R₁ is as defined above,
b. reacting a compound of formula IV,

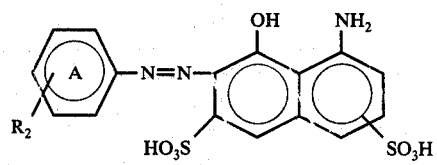   IV in which R₂ and A are as defined above,
with a compound of formula V, R₁—O—CO—Hal   V in which R₁ is as defined above, and Hal signifies fluorine, chlorine or bromine,
c. producing compounds of formula Ia,

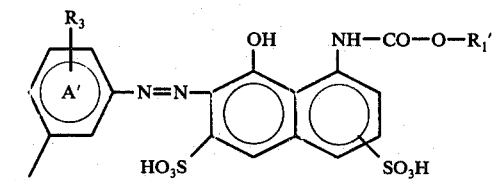   Ia in which
R'₁'s are identical and each signifies a straight or branched chain, optionally substituted alkyl radical or an optionally substituted aryl or cycloalkyl radical, for example an optionally substituted phenyl or cyclohexyl radical,
R₃ signifies hydrogen, halogen or a lower alkyl radical, and
ring A' bears no further substituents, by reacting a compound of formula XIV,

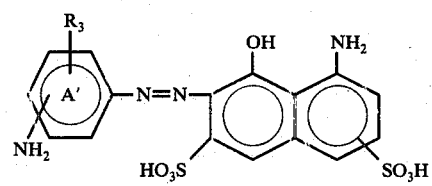   XIV in which R₃ and A' are as defined above,
with a compound of formula V, defined above.

The free acids may be converted into water-soluble salt form in conventional manner, preferably into an ammonium or alkali metal salt, especially a sodium salt.

The hydrocarbon radicals R₁ are preferably optionally substituted alkyl, aryl or cycloalkyl radicals. Examples of optionally substituted alkyl radicals are aralkyl radicals such as benzyl radicals. The cycloalkyl radicals usually contain 5 or 6 carbon atoms and therefore may in particular be cyclohexyl radicals. The alkyl radicals may be substituted by hydroxyl, halogen or cyano.

If R₁ (R₁') is an alkyl radical it may be an alkyl radical having, for example, 1 to 30, preferably 6 to 24 or especially 8 to 13, carbon atoms. Examples of branched alkyl radicals are iso-amyl, iso-octyl, tri-, tetra- and penta-propyl. Examples of cyclic alkyl radicals are cyclohexyl, mono-, di- and tri-methylcyclohexyl (4-methyl-, 3,5-dimethyl-, 2,4-trimethyl- and 3,5,5-dimethylcyclohexyl) and iso-butylcyclohexyl.

If R₁ and R₂ signify alkyl radicals these may be identical or different. When R₂ signifies an alkyl, alkoxy or alkylthio radical it is preferably lower, i.e. with 1 to 12, preferably 1 to 10 and more preferably 1 to 4, carbon atoms, and when substituted alkyl is suitably chloromethyl or fluoromethyl, and when alkoxy is suitably methoxy or ethoxy.

When $R_1$ or $R_2$ is aryl or aralkyl, "aryl" signifies preferably a phenyl radical. The alkyl radical in the aralkyl radical is preferably lower, i.e. with 1 to 8 or preferably 1 or 2 carbon atoms.

In $R_2$, suitable ester groups of sulphonic and carboxylic acids include groups which are esterified with a phenol or a lower or higher alcohol, for example a primary or secondary alcohol, in particular phenol, alkylphenols, methanol, ethanol, iso-propanol, iso-butanol, cyclohexanol, benzyl alcohol, n-octyl alcohol, iso-octyl alcohol, nonyl alcohol or lauryl alcohol. Suitable amide groups of sulphonic and carboxylic acids are groups amidated with primary or secondary amines or with ammonia. Examples of suitable primary and secondary amines are monomethylamine, dimethylamine, monoethylamine, diethylamine, ethylmethylamine, cyclohexylamine, 4-methylcyclohexylamine, 3,5-dimethylcyclohexylamine, 3,5,5-trimethylcyclohexylamine, 2,4,6-trimethylcyclohexylamine, aniline, toluidine, xylidine, N-phenyl-N-methylamine, N-phenyl-N-ethylamine and N,N-dicyclohexylamine. When $R_2$ signifies an amino group, it may be unsubstituted amino or the radical of one of the above mentioned amines. If $R_2$ signifies a carbamic ester group it is preferably a radical of the formula $—NH—CO—O—R_1$, preferably $—NH—CO—O—R_1'$, where $R_1$ and $R_1'$ are as defined above, and where these radicals may be identical to or different from the $R_1$ radical of the $NHCOOR_1$ radical on the naphthalene nucleus. If $R_2$ signifies an acylamino group, acyl may represent the radical of an aliphatic or aromatic carbocylic or sulphonic acid, of which aromatic sulphonic acids, higher alkylsulphonic acids and aliphatic carboxylic acids are preferred. Examples of suitable aromatic sulphonic acids are benzenesulphonic, toluenesulphonic and xylenesulphonic acids. Examples of suitable aliphatic carboxylic acids are acetic, chloroacetic, propionic, butyric and phenylacetic acid.

Suitable substituents for alkyl radicals or phenyl radicals occurring in $R_2$ include halogen atoms, preferably chlorine atoms, optionally substituted, linear or branched alkyl radicals, optionally substituted cyclohexyl radicals, and preferably, lower alkyl and alkoxy radicals and ester and amide groups of carboxylic acids.

If the ring A is further substituted it may bear one or more of the aforenamed substituents suitable for phenyl radicals; and it may bear a second group $R_2$ as substituent on the nucleus A. No group capable of metal complex formation may be present in the orthoposition to the azo group of the diazo component, e.g. hydroxyl, alkoxy, primary or secondary amines, carboxylic acid or carboxylic ester groups.

When ring A bears a condensed cycloalkyl radical, this is preferably a cyclohexyl radical.

The radical $R_3$ preferably signifies hydrogen, chlorine or lower alkyl, in particular an alkyl radical having 1 to 8, advantageously 1 to 6 or preferably 1 to 4, carbon atoms. Examples of suitable radicals are methyl, ethyl, propyl, iso-propyl, n-butyl, iso-butyl and tert. butyl.

When halogen is a substituent on ring A or on a substituent of the molecule, it may be fluorine, chlorine, bromine or iodine.

The total number of carbon atoms in $R_1$ and in the substituents on ring A is preferably at least 14.

The compounds of formula I may be prepared in conventional manner.

Thus, for example, the coupling reaction of a diazo compound from an amine of formula II with a compound of Formula III is suitably effected in alkaline medium, preferably in aqueous or aqueous-organic medium, preferably at a pH of from 8 to 12, especially a pH of 10. The reaction is preferably carried out at low temperatures, suitably from 0 to 30° C.

In process variant (b), the reaction may conveniently be carried out in aqueous or aqueous-organic medium, and it is preferred to use a condensation agent such as sodium carbonate. It is preferred to carry out the process at a pH close to the neutral point, preferably about 7.5 to 8. Suitable reaction temperatures are from room temperature to the boiling point of the reaction mixture, preferably from 40° to 90° C.

Process variant (c) is also carried out in conventional manner, suitably under the conditions set out for process b) above. It is preferred to use twice the molar quantity of the compound of formula V relative to the compound of formula XIV.

The compounds of formula I may be isolated in conventional manner from the final reaction mixture, for example by cooling and if necessary salting out, and may be purified in conventional manner.

The intermediates used in the reactions are known or may be produced in known manner or in analogy to known methods from known starting materials. Thus, for example, the compounds of formula III may be produced in conventional manner by reaction of 1-amino-8-hydroxynaphthalene-4,6- or -3,6-disulfonic acid with a compound of formula V. The compounds of formula IV may be produced in conventional manner by alkaline coupling of the diazo compound from an amine of formula II with 1-amino-8-hydroxynaphthalene-4,6- or -3,6-disulphonic acid, the substituent $R_2$ being formed either before or after the coupling reaction.

Preferred groups of compounds of formula I include compounds of formula Ib,

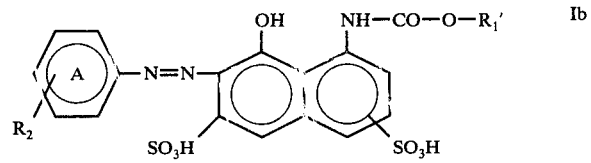

in which $R_1'$, $R_2$ and A are as defined above, particularly such compounds in which the $—SO_3H$ group is in the 3-position on the naphthalene nucleus; compounds of formula Ia as defined above but in which the $R_1'$ radicals are independent; compounds of formula Ic,

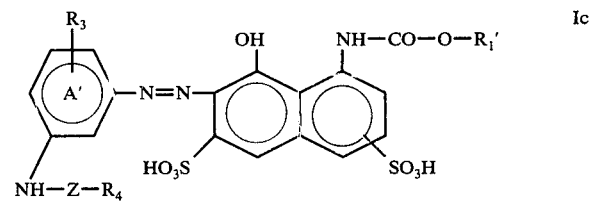

in which
$R_1'$, $R_3$ and A' are as defined above,
Z signifies $—SO_2—$ or $—CO—$, and R₄ signifies an unsubstituted, straight or branched alkyl radical, an optionally substituted cyclohexyl radical, a lower haloalkyl radical or an optionally substituted aryl radical, for example an optionally substituted phenyl radical;

compounds of formula Id,

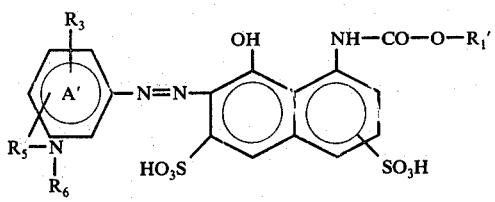

in which
R₁', R₃ and A' are as defined above,
R₅ signifies hydrogen, an unsubstituted, straight or branched alkyl radical, an optionally substituted cyclohexyl radical or an optionally substituted aryl radical, for example a phenyl radical, and
R₆ signifies hydrogen or a lower alkyl radical; and compounds of formula Ie,

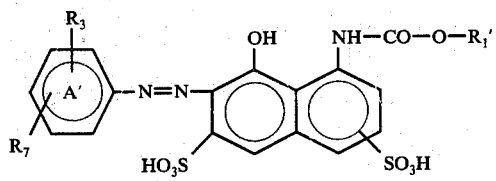

in which
R₁', R₃ and A' are as defined above, and
R₇ signifies hydrogen, halogen, alkoxy, an unsubstituted, straight or branched alkyl radical, an optionally substituted cyclohexyl radical, a lower haloalkyl radical or an optionally substituted aryl or alkylthio radical, for example the phenyl radical.

Especially suitable acyl radicals R₄—Z— are acyl radicals of lower alkylcarboxylic acids, e.g. acetic, chloroacetic, propionic, butyric and iso-butyric acid, and radicals of aromatic sulphonic acids, e.g. radicals of benzenesulphonic, toluenesulphonic and xylenesulphonic acids.

The radical

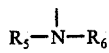

preferably signifies the NH₂ radical or a radical of any suitable amine in the description of R₂.

The radical R₇ may be any desired lower to higher linear or branched alkyl radical or cycloalkyl, e.g. a cyclohexyl radial, with 1 to 30 or preferably 1 to 12 carbon atoms. When alkyl, the radical may bear one halogen atom, preferably a chlorine atom. The preferred alkoxy radicals are lower and contain 1 to 8, preferably 1 to 6 or in particular 1 to 4, carbon atoms. The optionally substituted aryl radicals may be in particular benzene radicals which optionally may bear halogen atoms and/or alkyl or alkoxy radicals. Examples of suitable radicals R₇ are methyl, ethyl, propyl, iso-propyl, n-butyl, iso-butyl, tert.butyl, amyl, iso-amyl, n-hexyl, cyclohexyl, mono-, di- and tri-methylhexyl, isobutylhexyl, n-octyl, iso-octyl, decyl, lauryl, phenyl, chlorophenyl, methoxy, propoxy, isopropoxy, n-butoxy iso-butoxy and lauryloxy.

Further preferred compounds of this application are the compounds of the formula

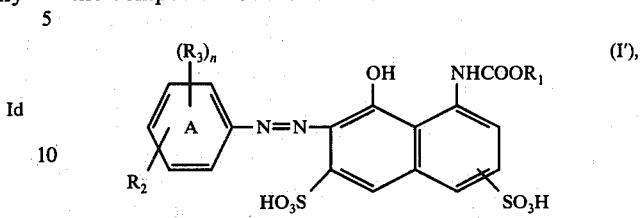

and water-soluble salts thereof, wherein
R₁ is C₆₋₁₄alkyl, cyclohexyl or cyclohexyl substituted by 1 to 3 C₁₋₄alkyls,
R₂ is hydrogen; C₁₋₁₂alkyl; C₁₋₁₂alkyl substituted by 1 to 3 chloros or fluoros; cyclohexyl; phenyl; C₁₋₄alkoxy; —NHCOOR; —NHCORx; —NHSO₂Ry; —SO₂NRpRq; —SO₃Rn; —COORm or —(CH₂)₄—,
wherein
R is C₆₋₁₄alkyl, cyclohexyl or cyclohexyl substituted by 1 to 3 C₁₋₄alkyls,
Rm is C₃₋₉alkyl or phenyl,
Rn is phenyl or phenyl substituted by cyclohexyl,
each of Rp and Rq is independently hydrogen, cyclohexyl, C₁₋₄alkyl, phenyl or phenyl substituted by 1 or 2 C₁₋₄alkyls, with the proviso that when one of Rp and Rq is phenyl or phenyl substituted by 1 or 2 C₁₋₄alkyls, the other is other than phenyl or phenyl substituted by 1 or 2 C₁₋₄alkyls,
Rx is C₁₋₆alkyl or C₁₋₆chloroalkyl,
Ry is tolyl or benzyl, and
the two ends of the —(CH₂)₄-radical are attached to adjacent carbon atoms of Ring A so as to form a fused cyclohexyl ring,
Ring A is further unsubstituted or further substituted by 1 or 2 substituents selected from chloro and C₁₋₄alkyl, with the proviso that Ring A is further unsubstituted when R₂ is —(CH₂)₄—,
with the proviso that the total number of carbon atoms in R₁ and the substituent(s) or fused cyclohexyl ring on Ring A is 12 to 30 (preferably 14 to 30, more preferably 18 to 30).

Preferred compounds of formula I' are the compounds wherein R₂ is —NHCOOR, C₁₋₁₂alkyl, C₁₋₁₂alkyl substituted by 1 to 3 chloros or fluoros, —SO₂NRpRq, —SO₃Rn or —(CH₂)₄—, preferably —NHCOOR, C₁₋₁₂alkyl (especially C₁₋₁₀alkyl) or —(CH₂)₄—.

Preferred groups of compounds of formula I' are the compounds wherein R₂ is —NHCOOR (particularly those wherein said total number of carbon atoms is 14 to 30, especially 18 to 30, as well as those wherein when R is alkyl it is C₈₋₁₄alkyl and when R₁ is alkyl it is C₈₋₁₄alkyl), the compounds wherein R₂ is —(CH₂)₄—, the compounds wherein R₂ is —SO₂NRpRq, the compounds wherein R₂ is —SO₃Rn, the compounds wherein R₂ is —NHCORx, the compounds wherein R₂ is —NHSO₂Ry, the compounds wherein R₂ is —COORm and the compounds wherein R₂ is C₁₋₁₂alkyl. The preferred compounds wherein R₂ is C₁₋₁₂alkyl are those wherein R₂ is C₁₋₁₀alkyl and those wherein said total number of carbon atoms is 14 to 30, preferably 18 to 30; more preferred are those wherein R₂ is C₁₋₁₀alkyl and said total number of carbon atoms is 14 to 30, preferably 18 to 30.

The compounds of formula I may be used, normally in the form of the monosodium or disodium salts, to dye the substrates for which dyes of anionic character are suitable, i.e. certain textile fibres, leather, nonwovens and paper. They are suitable for dyeing natural and synthetic polyamide fibres, natural and regenerated cellulosic fibres, polyurethane fibres, and other synthetic fibres modified by the introduction of basic groups, such as modified polypropylene and polyacrylonitrile fibres. Besides the dyeing of leather and paper, the compounds may be used for dyeing nonwovens, provided these are composed of acid dyeable fibres and/or the binder used is acid dyeable. They are applicable to textiles in all forms, e.g. monofilaments, multifilaments, yarns in hank and package forms, woven and knitted fabrics, pile fabrics, felts and carpets. Fibrous materials for paper or non-wovens can be dyed with those dyes in the mass or after formation of the sheet or the nonwoven. Leather can be dyed in the tanned or untanned state and can be dyed in skin form.

The compounds of formula I may be applied by exhaust dyeing, pad dyeing and printing processes. They are specially suitable for exhaust and pad dyeing as they are well soluble in cold water as well as warm water and have affinity for the fibre from neutral medium. Any of the conventional continuous or discontinuous dyeing processes can be employed, including the thermosol process, with the addition of any of the commonly used assistants as required. The dyes also show good suitability for space dyeing.

The compounds of this invention can be converted into stable, concentrated dyeing preparations as they have good solubility in the cold and good solvent stability.

The dyes show good neutral affinity and buildup; they migrate well and give level dyeings on polyamide textiles of irregular affinity. The dyeings are of brilliant red shade and have good fastness to light, good wet fastness properties, e.g. to washing, water, sea water, alkaline and acid preparation and milling, and good fastness to rubbing, gas fumes and dry cleaning.

It was found that dyeings obtained with compounds of formula I in which the number of carbon atoms in $R_1$ and in the substituent(s) on ring A is under 12, for example with compounds having a total of 10 carbon atoms in such substituents, are unsatisfactory in respect of wet fastness and neutral affinity for natural and synthetic polyamide fibres.

EXAMPLE 1

23.6 Parts of 1-amino-3-hexyloxycarbonylaminobenzene (obtained by reaction of m-nitroaniline with chloroformic acid hexyl ester and subsequent reduction of the nitro group to the amino group) are dissolved cold in 100 parts of water and 200 parts of ethyl alcohol. 3.5 Parts of sodium nitrite are added to the solution with stirring until everything is dissolved. In 30 minutes the solution is dropped with stirring into a solution of 30 parts of concentrated hydrochloric acid and 150 parts of water at 0°–2°. The diazo solution is stirred for 1 hour at 0°–2° and then dropped into a cooled solution of 44.7 parts of 1-hexyloxycarbonylamino-8-hydroxynaphthalene-3,6-disulphonic acid and 30 parts of 30% aqueous sodium hydroxide solution in 100 parts of water, the addition being controlled so that the temperature remains below 10° and the pH of the coupling mixture does not decrease to below 9. The mixture is stirred for a further 3 hours, during which time the temperature is allowed to increase to room temperature. The pH of the suspension is adjusted to 7 with hydrochloric acid; then the precipitated dye is filtered with suction, washed with ice-water and dried. On natural and synthetic polyamide fibres it gives dyeings of red shade having good light and wet fastness properties.

The dye has formula If,

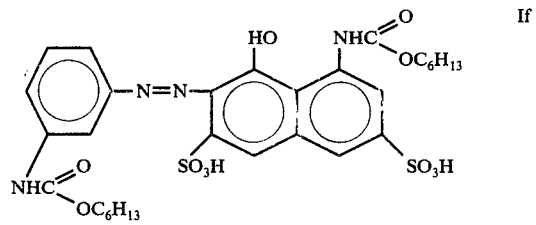

The same dye can be produced as follows: 43.8 Parts of the monoazo compound formed by coupling diazotized 1-amino-3-acetylaminobenzene with 1-amino-8-hydroxynaphthalene-3,6-disulphonic acid are dissolved in the form of the disodium salt in a mixture of 300 parts of water and 300 parts of alcohol. After the addition of 25 parts of concentrated hydrochloric acid the solution is raised to 90° and reacted at this temperature for 3 hours with stirring. On cooling to room temperature the precipitated deacetylated compound is filtered, washed until neutral and dissolved in 800 parts of water and 5 parts of sodium carbonate. The solution is heated to 50° and over 3 hours 35 parts of chloroformic acid hexyl ester are added dropwise with the simultaneous addition of aqueous sodium carbonate solution to maintain the gradually decreasing pH between 7.5 and 8 throughout the reaction. The solution is then cooled and the precipitated dye filtered with suction, washed with ice-water and dried.

The structural compositions of further compounds is shown in the following Table I. They can be produced in accordance with the procedure of Example I and agree with formula Ig,

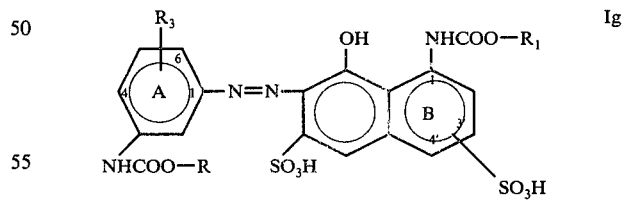

where the significances of R, $R_1$ and $R_3$ are as listed in the table.

Table I

| | | | Nature and position of the substituent $R_3$ in the ring A | | Position of $SO_3H$ in the ring B | Shade of dyeing on polyamide fibre |
|---|---|---|---|---|---|---|
| Exp. No. | $R_1$ | R | 4 | 6 | | |
| 2 | —$C_6H_{13}$ | —$C_6H_{13}$ | H | H | 4' | red |

Table I-continued

| Exp. No. | $R_1$ | R | Nature and position of the substituent $R_3$ in the ring A 4 | 6 | Position of $SO_3H$ in the ring B | Shade of dyeing on polyamide fibre |
|---|---|---|---|---|---|---|
| 3 | " | " | —$CH_3$ | H | 3' | " |
| 4 | " | " | " | H | 4' | " |
| 5 | " | " | —Cl | H | 3' | " |
| 6 | " | " | " | H | 4' | " |
| 7 | —$C_7H_{15}$ | —$C_7H_{15}$ | H | H | 3' | " |
| 8 | " | " | H | H | 4' | " |
| 9 | " | " | —$CH_3$ | H | 3' | " |
| 10 | " | " | " | H | 4' | " |
| 11 | " | " | —Cl | H | 3' | " |
| 12 | " | " | " | H | 4' | " |
| 13 | —$C_8H_{17}$ | —$C_8H_{17}$ | H | H | 3' | " |
| 14 | " | " | H | H | 4' | " |
| 15 | " | " | —$CH_3$ | H | 3' | " |
| 16 | " | " | " | H | 4' | " |
| 17 | " | " | —Cl | H | 3' | " |
| 18 | " | " | " | H | 4' | " |
| 19 | " | " | " | Cl | 3' | " |
| 20 | " | " | " | " | 4' | " |
| 21 | —$C_8H_{17}$iso | —$C_8H_{17}$iso | H | H | 3' | " |
| 22 | " | " | H | H | 4' | " |
| 23 | " | " | —$CH_3$ | H | 3' | " |
| 24 | " | " | " | H | 4' | " |
| 25 | " | " | —Cl | H | 3' | " |
| 26 | " | " | " | H | 4' | " |
| 27 | " | " | " | —Cl | 3' | " |
| 28 | " | " | " | " | 4' | " |
| 29 | —$CH_2$—CH—$C_4H_9$ \| $C_2H_5$ | —$CH_2$—CH—$C_4H_9$ \| $C_2H_5$ | H | H | 3' | " |
| 30 | " | " | H | H | 4' | " |
| 31 | " | " | —$CH_3$ | H | 3' | " |
| 32 | " | " | " | H | 4' | " |
| 33 | " | " | —Cl | H | 3' | " |
| 34 | " | " | " | H | 4' | " |
| 35 | " | " | " | —Cl | 3' | " |
| 36 | " | " | " | " | 4' | " |
| 37 | —$C_9H_{19}$ | —$C_9H_{19}$ | H | H | 3' | " |
| 38 | " | " | H | H | 4' | " |
| 39 | " | " | —$CH_3$ | H | 3' | " |
| 40 | " | " | " | H | 4' | " |
| 41 | " | " | —Cl | H | 3' | " |
| 42 | " | " | " | H | 4' | " |
| 43 | —$C_{10}H_{21}$ | —$C_{10}H_{21}$ | H | H | 3' | " |
| 44 | " | " | H | H | 4' | " |
| 45 | " | " | —$CH_3$ | H | 3' | " |
| 46 | " | " | " | H | 4' | " |
| 47 | " | " | —Cl | H | 3' | " |
| 48 | " | " | " | H | 4' | " |
| 49 | —$C_{11}H_{23}$ | —$C_{11}H_{23}$ | H | H | 3' | " |
| 50 | " | " | H | H | 4' | " |
| 51 | " | " | —$CH_3$ | H | 3' | " |
| 52 | " | " | " | H | 4' | " |
| 53 | " | " | —Cl | H | 3' | " |
| 54 | " | " | " | H | 4' | " |
| 55 | —$C_{12}H_{25}$ | —$C_{12}H_{25}$ | H | H | 3' | " |
| 56 | " | " | H | H | 4' | " |
| 57 | " | " | —$CH_3$ | H | 3' | " |
| 58 | " | " | " | H | 4' | " |
| 59 | " | " | —Cl | H | 3' | " |
| 60 | " | " | " | H | 4' | " |
| 61 |  |  | H | H | 3' | " |
| 62 | " | " | H | H | 4' | " |
| 63 | " | " | —$CH_3$ | H | 3' | " |
| 64 | " | " | " | H | 4' | " |
| 65 | " | " | —Cl | H | 3' | " |
| 66 | " | " | " | H | 4' | " |
| 67 | 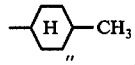—$CH_3$ | 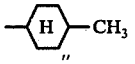—$CH_3$ | H | H | 3' | " |
| 68 | " | " | H | H | 4' | " |
| 69 | " | " | —$CH_3$ | H | 3' | " |
| 70 | " | " | " | H | 4' | " |
| 71 | " | " | —Cl | H | 3' | " |
| 72 | " | " | " | H | 4' | " |
| 73 | 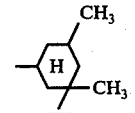 | 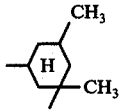 | H | H | 3' | " |
| 74 | " | " | H | H | 4' | " |
| 75 | " | " | —$CH_3$ | H | 3' | " |
| 76 | " | " | " | H | 4' | " |

Table I-continued

| Exp. No. | $R_1$ | R | Nature and position of the substituent $R_3$ in the ring A 4 | 6 | Position of $SO_3H$ in the ring B | Shade of dyeing on polyamide fibre |
|---|---|---|---|---|---|---|
| 77 | " | " | —Cl | H | 3' | " |
| 78 | " | " | " | H | 4' | " |
| 79 | —⟨H⟩—C(CH₃)₂—CH₃ with CH₃ | —⟨H⟩—C(CH₃)₂—CH₃ with CH₃ | H | H | 3' | " |
| 80 | " | " | H | H | 4' | " |
| 81 | " | " | —CH₃ | H | 3' | " |
| 82 | " | " | " | H | 4' | " |
| 83 | " | " | —Cl | H | 3' | " |
| 84 | " | " | " | H | 4' | " |
| 85 | " | —C₆H₁₃ | H | H | 3' | " |
| 86 | " | " | H | H | 4' | " |
| 87 | " | —CH₂—CH(C₂H₅)—C₄H₉ | H | H | 3' | " |
| 88 | " | " | H | H | 4' | " |
| 89 | —C₁₀H₂₁ | " | H | H | 4' | " |
| 90 | " | " | H | H | 3' | " |
| 91 | —CH₂—CH(C₂H₅)—C₄H₉ | —⟨H⟩ | H | H | 3' | " |
| 92 | " | " | H | H | 4' | " |
| 93 | " | —C₆H₁₃ | H | H | 3' | " |
| 94 | " | " | H | H | 4' | " |
| 95 | " | —C₇H₁₅ | H | H | 3' | " |

EXAMPLE 96

15 Parts of 1-amino-3-acetylaminobenzene are dissolved in 100 parts of water and 200 parts of ethyl alcohol. 3.5 Parts of sodium nitrite are added to the solution with stirring until everything has gone into solution. With constant stirring the solution is added dropwise over 30 minutes into 30 parts of concentrated hydrochloric acid and 150 parts of water at 0°–2°. The combined solution is added dropwise to a cooled solution of 53.1 parts of 1-decyloxycarbonylamino-8-hydroxynaphthalene-3,6-disulfonic acid, 30 parts of 30% aqueous sodium hydroxide solution and 100 parts of water, the addition being controlled so that the temperature remains below 10° and the pH of the coupling suspension does not drop to below 9. The suspension is then dried for 8 hours, during which time the temperature is allowed to increase to room temperature. Afterwards its pH is adjusted to 7 with hydrochloric acid and the precipitated dye filtered with suction, washed with common salt solution and dried at 100°.

Applied to natural or synthetic polyamide fibres from a neutral to weakly acid medium, this dye gives bright red shades showing good light and wet fastness. It has formula Ih,

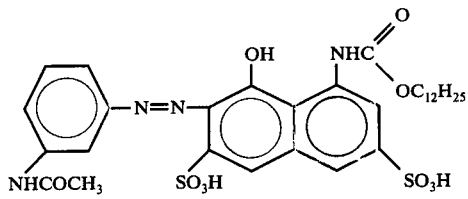

The same dye can be produced as follows. 48 parts of the monoazo dye formed by coupling diazotized 1-amino-3-acetylaminobenzene with 1-amino-8-hydroxynaphthalene-3,6-disulphonic acid are dissolved in the form of the disodium salt in 600 parts of water at 60°. In 3 hours 30 parts of chloroformic acid dodecyl ester are dropped into the solution. At the same time aqueous sodium carbonate solution is added to maintain the otherwise gradually decreasing pH between 7.5 and 8 throughout the reaction. Subsequently, the solution is cooled to 20° and the precipitated dye filtered with suction, washed with ice-water and dried at 100°.

The examples of further compounds in Table II can be produced in accordance with the procedure of Example 96 and conform to formula Ii,

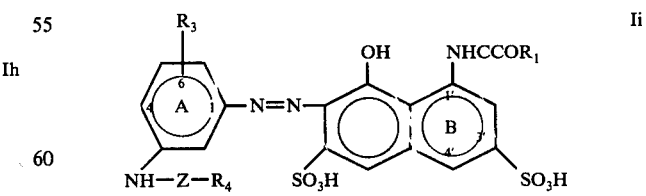

where $R_1$, $R_3$, $R_4$ and Z have the meanings given in the pertinent columns.

Table II

| Ex. No. | $R_1$ | $R_4$ | Z | Nature and position of the substituent $R_3$ in the ring A 4 | 6 | Position of $SO_3H$ in the ring B | Shade of dyeing on polyamide fibre |
|---|---|---|---|---|---|---|---|
| 97 | $-C_{12}H_{25}$ | $-CH_3$ | $-CO-$ | H | H | 4' | red |
| 98 | " | " | " | $-CH_3$ | H | 4' | " |
| 99 | " | " | " | " | H | 3' | " |
| 100 | " | " | " | $-Cl$ | H | 3' | " |
| 101 | " | " | " | " | H | 4' | " |
| 102 | " | $-CH_2Cl$ | " | " | H | 4' | " |
| 103 | " | " | " | " | H | 3' | " |
| 104 | " | " | " | $-CH_3$ | H | 3' | " |
| 105 | " | " | " | " | H | 4' | " |
| 106 | " | " | " | H | H | 4' | " |
| 107 | " | " | " | H | H | 3' | " |
| 108 | " | " | " | $-Cl$ | $-Cl$ | 3' | " |
| 109 | " | " | " | " | " | 4' | " |
| 110 | $-C_{11}H_{23}$ | " | " | " | " | 4' | " |
| 111 | " | " | " | " | " | 3' | " |
| 112 | " | " | " | $CH_3$ | H | 3' | " |
| 113 | " | " | " | " | H | 4' | " |
| 114 | " | " | " | Cl | H | 4' | " |
| 115 | " | " | " | " | H | 3' | " |
| 116 | " | " | " | H | H | 4' | " |
| 117 | " | $-CH_3$ | " | H | H | 4' | " |
| 118 | " | " | " | H | H | 3' | " |
| 119 | " | $-C_2H_5$ | " | H | H | 3' | " |
| 120 | " | " | " | H | H | 4' | " |
| 121 | " | $-C_3H_7$ | " | H | H | 4' | " |
| 122 | " | " | " | H | H | 3' | " |
| 123 | $-C_{10}H_{21}$ | $-CH_3$ | " | $-CH_3$ | H | 3' | " |
| 124 | " | " | " | " | H | 4' | " |
| 125 | " | $-CH_2Cl$ | " | " | H | 3' | " |
| 126 | " | " | " | " | H | 4' | " |
| 127 | " | $-C_2H_5$ | " | " | H | 4' | " |
| 128 | " | " | " | " | H | 3' | " |
| 129 | " | " | " | $-Cl$ | H | 3' | " |
| 130 | " | " | " | " | H | 4' | " |
| 131 | " | $-C_3H_7$ | " | H | H | 4' | " |
| 132 | " | " | " | H | H | 3' | " |
| 133 | " | " | " | $-CH_3$ | H | 3' | " |
| 134 | " | " | " | " | H | 4' | " |
| 135 | " | $-C_4H_9$ | " | " | H | 4' | " |
| 136 | " | " | " | " | H | 3' | " |
| 137 | ⟨H⟩−C(CH_3)_3 | " | " | " | H | 3' | " |
| 138 | " | " | " | H | H | 4' | " |
| 139 | " | " | " | H | H | 3' | " |
| 140 | " | $-C_3H_7$ | " | H | H | 3' | " |
| 141 | " | " | " | H | H | 4' | " |
| 142 | " | " | " | $-CH_3$ | H | 4' | " |
| 143 | " | " | " | " | H | 3' | " |
| 144 | " | $-C_2H_5$ | " | " | H | 3' | " |
| 145 | " | " | " | " | H | 4' | " |
| 146 | " | $-CH_3$ | " | " | H | 4' | " |
| 147 | " | " | " | " | H | 3' | " |
| 148 | " | $-CH_2Cl$ | " | " | H | 3' | " |
| 149 | " | " | " | " | H | 4' | " |
| 150 | " | " | " | " | H | 3' | " |
| 151 | $-C_9H_{19}$ | $-C_2H_5$ | " | " | H | 3' | " |
| 152 | " | " | " | " | H | 4' | " |
| 153 | " | $-C_3H_7$ | " | " | H | 3' | " |
| 154 | " | " | " | " | H | 4' | " |
| 155 | " | " | " | H | H | 4' | " |
| 156 | " | " | " | H | H | 3' | " |
| 157 | " | " | " | $-Cl$ | H | 3' | " |
| 158 | " | " | " | " | H | 4' | " |
| 159 | " | $-C_4H_9$ | " | H | H | 4' | " |
| 160 | " | " | " | H | H | 3' | " |
| 161 | " | $-C_5H_{11}$ | " | H | H | 3' | " |
| 162 | " | " | " | H | H | 4' | " |
| 163 | " | " | " | $-CH_3$ | H | 4' | " |
| 164 | " | " | " | " | H | 3' | " |
| 165 | ⟨H⟩(CH_3)_3 | $-C_2H_5$ | " | " | H | 3' | " |
| 166 | " | " | " | " | H | 4' | " |
| 167 | " | " | " | " | H | 4' | " |
| 168 | " | " | " | " | H | 3' | " |
| 169 | " | $-C_3H_7$ | " | H | H | 3' | " |
| 170 | " | " | " | H | H | 4' | " |
| 171 | " | $-C_4H_9$ | " | H | H | 4' | " |
| 172 | " | " | " | H | H | 3' | " |
| 173 | " | $-C_5H_{11}$ | " | H | H | 3' | " |

Table II-continued

| Ex. No. | $R_1$ | $R_4$ | Z | Nature and position of the substituent $R_3$ in the ring A 4 | 6 | Position of $SO_3H$ in the ring B | Shade of dyeing on polyamide fibre |
|---|---|---|---|---|---|---|---|
| 174 | " | " | " | H | H | 4' | " |
| 175 | —$C_8H_{17}$ | —$C_3H_7$ | " | —$CH_3$ | H | 4' | " |
| 176 | " | " | " | " | H | 3' | " |
| 177 | " | —$C_4H_9$ | " | " | H | 3' | " |
| 178 | —$C_8H_{17}$ | " | " | " | H | 4' | " |
| 179 | " | " | " | H | H | 4' | " |
| 180 | " | " | " | H | H | 3' | " |
| 181 | " | —$C_5H_{11}$ | " | H | H | 3' | " |
| 182 | " | " | " | H | H | 4' | " |
| 183 | —$CH_2$—CH—$C_4H_9$ \| $C_2H_5$ | —$C_3H_7$ | " | —$CH_3$ | H | 4' | " |
| 184 | " | " | " | " | H | 3' | " |
| 185 | " | " | " | " | H | 3' | " |
| 186 | " | " | " | " | H | 4' | " |
| 187 | " | —$C_4H_9$ | " | H | H | 4' | " |
| 188 | " | —$C_5H_{11}$ | " | H | H | 3' | " |
| 189 | " | " | " | H | H | 4' | " |
| 190 | " | —$SO_2$— | | H | H | 4' | " |
| 191 | " | " | " | H | H | 3' | " |
| 192 | —$C_7H_{15}$ | " | " | H | H | 3' | " |
| 193 | " | " | " | H | H | 4' | " |
| 194 | —$C_6H_{13}$ | " | " | H | H | 4' | " |
| 195 | " | " | " | H | H | 3' | " |
| 196 |  | " | " | H | H | 3' | " |
| 197 | " | " | " | H | H | 4' | " |
| 198 | " | —$C_5H_{11}$ | —CO— | —$CH_3$ | H | 4' | " |
| 199 | " | " | " | " | H | 3' | " |
| 200 | —$C_6H_{13}$ | " | " | " | H | 3' | " |
| 201 | " | " | " | " | H | 4' | " |
| 202 | " | —$C_6H_{13}$ | " | " | H | 4' | " |
| 202a | —$CH_2CH$—$C_4H_9$ \| $C_2H_5$ | —$CH_2$— | —$SO_2$— | H | H | 4' | " |

EXAMPLE 203

27.6 Parts of 4-aminobenzene-1-sulphonic acid N-ethyl-N-phenyl amide are suspended in 200 parts of glacial acetic acid, dissolved by dropwise addition of 25 parts of a 2% hydrochloric acid solution and diazotized at 10° by the slow addition of 7 parts of sodium nitrite in 20 parts of water. The diazo solution is allowed to flow at 0°-5° into an alkaline solution of the disodium salt of 44.7 parts of 1-hexyloxycarbonylamino-8-hydroxynaphthalene-3,6-disulphonic acid in 400 parts of water, with care taken to prevent a decrease in pH to below 9. The reaction solution is stirred for 8 hours at 10° and acidified with hydrochloric acid; the precipitated dye is filtered and dried at 100°.

This dye is of formula Ij,

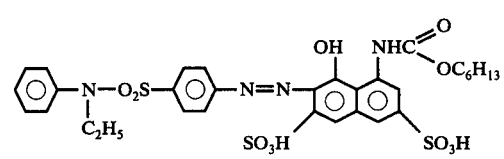

It dyes wool and nylon from a neutral to weak acid bath in bright, level red shades of good light and wet fastness.

The same dye can be produced as follows: 60.6 Parts of the monoazo dye formed by coupling diazotized 4-amino-1-sulphonic acid-N-ethyl-N-phenylamide with 1-amino-8-hydroxynaphthalene-3,6-disulphonic acid are dissolved in 800 parts of water and 5 parts of sodium carbonate. The solution is raised to 50° and 18 parts of chloroformic acid hexyl ester are added dropwise in the course of 1 hour, with the simultaneous addition of aqueous sodium carbonate solution so that the otherwise gradually decreasing pH remains at 7.5 to 8 during the reaction. The partially dissolved dye is precipitated with common salt, filtered with suction, washed with common salt solution and dried.

In Table III below further monoazo compounds of this invention are specified, wihc can be produced in accordance with the procedure of Example 203 and are of formula Ik,

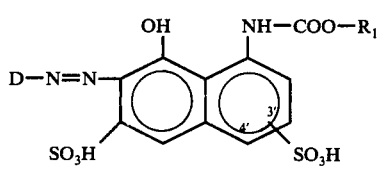

where D signifies the radical of a diazo component and $R_1$ has the significance given in the table.

Table III

| Ex. No. | Radical of the diazo component D | $R_1$ | Position of $SO_3H$ in the ring B | Shade of dyeing on polyamide fibre |
|---|---|---|---|---|
| 204 | 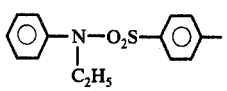 | $-C_7H_{15}$ | 4' | red |
| 205 | " | " | 3' | " |
| 206 | " | $-C_8H_{17}$ | 3' | " |
| 207 | " | " | 4' | " |
| 208 | " | $-CH_2-CH(C_2H_5)-C_4H_9$ | 4' | " |
| 209 | " | " | 3' | " |
| 210 | " | $-C_9H_{19}$ | 3' | " |
| 211 | " | " | 4' | " |
| 212 | " | $-C_{10}H_{21}$ | 4' | " |
| 213 | " | " | 3' | " |
| 214 | " | $-C_{12}H_{25}$ | 3' | " |
| 215 | " | " | 4' | " |
| 216 | " |  | 4' | " |
| 217 | " | " | 3' | " |
| 218 | " | 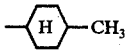 | 3' | " |
| 219 | " | " | 4' | " |
| 220 | " | 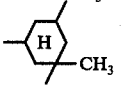 | 4' | " |
| 221 | " | " | 3' | " |
| 222 | " | " | 3' | " |
| 223 | " | " | 4' | " |
| 224 | " | $-C_{12}H_{25}$ | 4' | " |
| 225 |  | " | 3' | " |
| 226 | 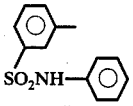 | " | 3' | " |
| 227 | " | $-C_{10}H_{21}$ | 3' | " |
| 228 | " | $-C_9H_{19}$ | 3' | " |
| 229 | " | " | 4' | " |
| 230 | " | $-C_8H_{17}$ | 4' | " |
| 231 | " | $-C_8H_{17}$ iso | 4' | " |
| 232 | " | " | 3' | " |
| 233 | " | $-C_7H_{15}$ | 3' | " |
| 234 | " | $-C_6H_{13}$ | 3' | " |
| 235 | " |  | 3' | " |
| 236 | " | 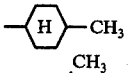 | 3' | " |
| 237 | " | 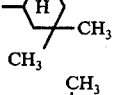 | 3' | " |
| 238 | " | 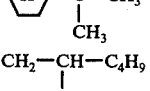 | 3' | " |
| 239 | " | $-CH_2-CH(C_2H_5)-C_4H_9$ | 3' | " |
| 240 | " | " | 4' | " |
| 241 | 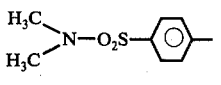 | 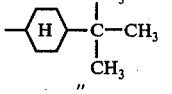 | 4' | " |
| 242 | " | " | 3' | " |
| 243 | " | $-C_{11}H_{23}$ | 3' | " |
| 244 | " | " | 4' | " |

Table III-continued

| Ex. No. | Radical of the diazo component D | $R_1$ | Position of $SO_3H$ in the ring B | Shade of dyeing on polyamide fibre |
|---|---|---|---|---|
| 245 | " | $-C_{12}H_{25}$ | 4' | " |
| 246 | " | | 3' | " |
| 247 | " | $-C_{14}H_{29}$ | 3' | " |
| 248 | " | | 4' | " |
| 249 | " | $-C_{10}H_{21}$ | 4' | " |
| 250 | " | | 3' | " |
| 251 | $H_5C_2\!\!>\!\!N-O_2S-\!\!\langle O\rangle\!\!-$<br>$H_5C_2$ | $-\langle H\rangle\!\!\begin{array}{c}CH_3\\CH_3\\CH_3\end{array}$ | 3' | " |
| 252 | " | " | 4' | " |
| 253 | $Cl-\!\!\langle O\rangle\!\!-$<br>$SO_2NH-\!\!\langle O\rangle\!\!-CH_3$<br>$CH_3$ | " | 4' | " |
| 254 | " | " | 3' | " |
| 255 | " | $-\langle H\rangle$ | 3' | " |
| 256 | " | $-C_6H_{13}$ | 3' | " |
| 257 | " | | 4' | " |
| 258 | " | $-C_7H_{15}$ | 4' | " |
| 259 | $\langle O\rangle\!\!-O-O_2S-\!\!\langle O\rangle\!\!-$ | | 4' | " |
| 260 | " | $-C_6H_{13}$ | 4' | " |
| 261 | " | | 3' | " |
| 262 | $\langle O\rangle$<br>$COOC_6H_{13}$ | " | 3' | " |

The following amines can also be employed as diazo components:

1-aminobenzene-2-sulphonic acid-N-ethyl-N-phenylamide
1-amino-4-methylbenzene-3-sulphonic acid-N-ethyl-N-phenylamide
1-amino-4-chlorobenzene-3-sulphonic acid-N-ethyl-N-phenylamide
1-amino-2-chlorobenzene-4-sulphonic acid-N-methylamide
2-amino-1-methylbenzene-4-sulphonic acid amide
1-amino-4-methylbenzene-3-sulphonic acid-N-phenylamide
2-amino-1-methylbenzene-4-sulphonic acid-N-dimethylamide
2-aminobenzenesulphonic acid phenyl ester
3-aminobenzenesulphonic acid-phenylester
4-aminobenzenesulphonic acid phenyl ester
2-aminobenzene-1-sulphonic acid dicyclohexylamide
1-aminobenzene-3-carboxylic acid-N-phenylamide
1-aminobenzene-3-carboxylic acid cyclohexylester
1-aminobenzene-3-carboxylic acid benzylester
1-aminobenzene-3-carboxylic acid octylester
1-aminobenzene-3-carboxylic acid nonylester
1-aminobenzene-3-carboxylic acid isopropylester
1-aminobenzene-3-carboxylic acid isobutylester
1-aminobenzene-3,6-dicarboxylic acid dibutylester

EXAMPLE 263

A solution of 14.9 parts of p-butylaniline in 30 parts of concentrated hydrochloric acid and 200 parts of water is prepared and diazotized at 0°–5° with a solution of 3.5 parts of sodium nitrite in 50 parts of water. The diazo solution is allowed to flow at 0°–5° into an alkaline solution of the disodium salt of 47.5 parts of 1-octyloxycarbonylamino-8-hydroxynaphthalene-3,6-disulphonic acid in 400 parts of water in a controlled manner so that the pH of the coupling solution does not fall to below 9. After stirring for 8 hours at 10° hydrochloric acid is added to precipitate the dye, which is isolated by filtration and dried at 100°.

The dye thus obtained, which has formula II,

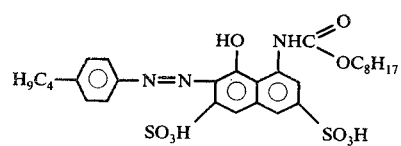

is applied to wool and nylon from a neutral to weak acid medium and gives bright, level shades of good light and wet fastness.

The identical dye can be produced as follows: 47.9 parts of the monoazo dye obtained by coupling diazotized-p-butylaniline with 1-amino-8-hydroxynaphthalene-3,6-disulphonic acid in alkaline medium are dissolved in 800 parts of water and 5 parts of sodium carbonate. The solution is heated to 50° and in 1 hour 21 parts of chloroformic acid octyl ester are added dropwise. At the same time aqueous sodium carbonate solution is added to check the gradual decrease in the pH and maintain the value between 7.5 and 8. The partially dissolved dye is then precipitated with common salt, isolated by filtration, washed with common salt solution and dried.

Further compounds of general formula Ik which may be prepared in similar manner to the foregoing are set out in the following Table IV.

Table IV

| Ex. No. | Radical of the diazo component D | $R_1$ | Position of $SO_3H$ in the ring B | Shade of dyeing on polyamide fibre |
|---|---|---|---|---|
| 264 | phenyl | $-C_{12}H_{25}$ | 3' | red |
| 265 | " | " | 4' | " |
| 266 | 2-methylphenyl | " | 4' | " |
| 267 | " | " | 3' | " |
| 268 | " | $-C_{11}H_{23}$ | 3' | " |
| 269 | " | " | 4' | " |
| 270 | 3,5-dimethylphenyl | " | 4' | " |
| 271 | " | " | 3' | " |
| 272 | " | $-C_{12}H_{25}$ | 3' | " |
| 273 | " | " | 4' | " |
| 274 | 4-methylphenyl (H₃C-) | " | 4' | " |
| 275 | " | " | 3' | " |
| 276 | " | $-C_{11}H_{23}$ | 3' | " |
| 277 | " | " | 4' | " |
| 278 | " | $-C_{12}H_{25}$ | 4' | " |
| 279 | 2-chlorophenyl | " | 3' | " |
| 280 | " | " | 3' | " |
| 281 | 3-chlorophenyl | " | 4' | " |
| 282 | " | " | 4' | " |
| 283 | 4-chlorophenyl | " | 3' | " |
| 284 | " | " | 3' | " |
| 285 | 2,3-dimethylphenyl | " | 4' | " |
| 286 | " | $-C_{11}H_{23}$ | 4' | " |
| 287 | " | " | 3' | " |
| 288 | " | $-C_{10}H_{21}$ | 3' | " |
| 289 | " | " | 4' | " |
| 290 | 2,5-dimethylphenyl | " | 4' | " |

4,080,322

Table IV-continued

| Ex. No. | Radical of the diazo component D | R₁ | Position of SO₃H in the ring B | Shade of dyeing on polyamide fibre |
|---|---|---|---|---|
| 291 | " | " | 3' | " |
| 292 | " | $-C_{11}H_{23}$ | 3' | " |
| 293 | " | | 4' | " |
| 294 | " | $-C_{12}H_{25}$ | 4' | " |
| 295 | " | | 3' | " |
| 296 | " | cyclohexyl-C(CH₃)₃ | 3' | " |
| 297 | " | " | 4' | " |
| 298 | 2,4-dimethylphenyl (H₃C, CH₃) | | 4' | " |
| 299 | " | " | 3' | " |
| 300 | " | $-C_{10}H_{21}$ | 3' | " |
| 301 | " | | 4' | " |
| 302 | " | $-C_{11}H_{23}$ | 4' | " |
| 303 | " | | 3' | " |
| 304 | " | $-C_{12}H_{25}$ | 3' | " |
| 305 | " | | 4' | " |
| 306 | 3,5-dimethylphenyl (H₃C, CH₃, CH₃) | " | 4' | " |
| 307 | " | " | 3' | " |
| 308 | " | $-C_{11}H_{23}$ | 3' | " |
| 309 | " | | 4' | " |
| 310 | " | $-C_{10}H_{21}$ | 4' | " |
| 311 | " | | 3' | " |
| 312 | " | $-C_9H_{19}$ | 3' | " |
| 313 | " | | 4' | " |
| 314 | " | cyclohexyl-C(CH₃)₃ | 4' | " |
| 315 | " | " | 3' | " |
| 316 | " | trimethylcyclohexyl | 3' | " |
| 317 | " | " | 4' | " |
| 318 | " | $-C_{12}H_{25}$ | 4' | " |
| 319 | 4-ethylphenyl (H₅C₂-) | " | 3' | " |
| 320 | " | $-C_{11}H_{23}$ | 3' | " |
| 321 | " | | 4' | " |
| 322 | " | $-C_{10}H_{21}$ | 4' | " |
| 323 | " | | 3' | " |
| 324 | 4-propylphenyl (H₇C₃-) | " | 3' | " |
| 325 | " | " | 4' | " |
| 326 | " | $-C_9H_{19}$ | 4' | " |
| 327 | " | | 3' | " |
| 328 | " | $-C_{11}H_{23}$ | 3' | " |
| 329 | " | | 4' | " |
| 330 | 4-isopropylphenyl (iso H₇C₃-) | " | 4' | " |
| 331 | " | $-C_{10}H_{21}$ | 4' | " |
| 332 | " | | 3' | " |
| 333 | " | $-C_{12}H_{25}$ | 3' | " |

Table IV-continued

| Ex. No. | Radical of the diazo component D | $R_1$ | Position of $SO_3H$ in the ring B | Shade of dyeing on polyamide fibre |
|---|---|---|---|---|
| 334 | iso $H_7C_3$-⟨phenyl⟩- | " | 4' | " |
| 335 | " | $-C_9H_{19}$ | 4' | " |
| 336 | " | " | 3' | " |
| 337 | " | -⟨cyclohexyl⟩-C(CH$_3$)$_2$CH$_3$/CH$_3$ (tert-butyl cyclohexyl) | 3' | " |
| 338 | " | " | 4' | " |
| 339 | " | " | 4' | " |
| | $H_9C_4$-⟨phenyl⟩- | | | |
| 340 | " | " | 3' | " |
| 341 | " | " | 3' | " |
| | | (3,3,5-trimethylcyclohexyl) | | |
| 342 | " | " | 4' | " |
| 343 | " | $CH_2CH-C_4H_9$ \| $C_2H_5$ | 4' | " |
| 344 | " | " | 3' | " |
| 345 | " | $-C_{10}H_{21}$ | 3' | " |
| 346 | " | " | 3' | " |
| 347 | " | " | 4' | " |
| | ⟨cyclohexyl-phenyl⟩- | | | |
| 348 | " | " | 3' | " |
| 349 | " | $CH_2CH-C_4H_9$ \| $C_2H_5$ | 3' | " |
| 350 | " | $-C_6H_{13}$ | 4' | " |
| 351 | " | " | 3' | " |
| 352 | " | $-C_7H_{15}$ | 3' | " |
| 353 | " | " | 4' | " |
| 354 | ⟨biphenyl⟩- | $-C_7H_{15}$ | 4' | " |
| 355 | " | " | 3' | " |
| 356 | " | $-C_{10}H_{21}$ | 4' | " |
| | $H_5C_2O$-⟨phenyl⟩- | | | |
| 357 | " | " | 3' | " |
| 358 | " | $-C_{12}H_{25}$ | 3' | " |
| 359 | " | " | 3' | " |
| | $H_3CO$-⟨phenyl⟩- | | | |
| 360 | " | " | 4' | " |
| 361 | " | $-C_6H_{13}$ | 4' | " |
| | $H_{21}C_{10}$-⟨phenyl⟩- | | | |
| 362 | " | $-CH_2CH-C_4H_9$ \| $C_2H_5$ | 4' | " |
| 363 | " | " | 4' | " |
| | $CH_3-C(CH_3)_2$-⟨phenyl⟩- (tert-butyl phenyl) | | | |
| 364 | " | " | 3' | " |

Table IV-continued

| Ex. No. | Radical of the diazo component D | $R_1$ | Position of $SO_3H$ in the ring B | Shade of dyeing on polyamide fibre |
|---|---|---|---|---|
| 365 | 4-Cl, 2-CF₃-phenyl | $-C_{12}H_{25}$ | 3' | " |
| 366 | 4-SCH₃-phenyl | " | " | " |
| 367 | 4-O₂N-phenyl | " | " | " |
| 367a | 4-H₂₅C₁₂-phenyl | $-C_6H_{16}$ | 4' | " |
| 368 | 4-(H₅C₂)₂N-phenyl | $-CH_2CHC_4H_9$<br>$\quad\quad\;\;\;\mid$<br>$\quad\quad\;\;\;C_2H_5$ | 3' | " |
| 369 | 3-NHC₂H₅-phenyl | $-C_{10}H_{21}$ | " | " |
| 370 | 5,6,7,8-tetrahydronaphthyl | $-CH_2-CH-C_4H_9$<br>$\quad\quad\quad\;\;\mid$<br>$\quad\quad\quad\;\;C_2H_5$ | " | " |
| 371 | 5,6,7,8-tetrahydronaphthyl | " | " | " |
| 372 | phenyl-SO₂-O-phenyl-cyclohexyl | " | " | " |
| 373 | phenyl-SO₂-N(cyclohexyl)₂ | " | " | " |

Application Example

A dyebath is prepared with 4000 parts of water, 10 parts of anhydrous sodium sulphate and 2 parts of the dye produced as in Example 1. At 40° 100 parts of a fabric of synthetic polyamide fibres, e.g. nylon 6, are entered. The bath is brought to the boil in 30 minutes and held at the boil for 1 hour, after which 4 parts of glacial acetic acid are added and dyeing is continued for 30 minutes at the boil with continuous replacement of the water lost by evaporation. The fabric is removed from the bath, rinsed with water and dried. A brilliant red dyeing is obtained. This method can also be employed for dyeing wool and silk. The dyeings have good light and wet fastness properties.

What is claimed is:

1. A compound of the formula

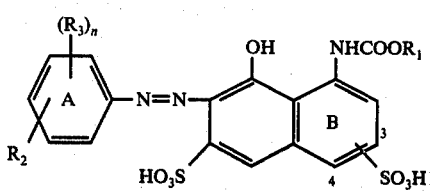

or a water-soluble salt thereof, wherein
- $R_1$ is $C_{6-14}$alkyl, cyclohexyl or cyclohexyl substituted by 1 to 3 $C_{1-4}$alkyls,
- $R_2$ is $C_{1-12}$alkyl, —NHCOOR, —NHCORx, —NHSO$_2$Ry, —SO$_2$NRpRq, —SO$_3$Rn, —COORm or —(CH$_2$)$_4$—, wherein
  - R is $C_{6-14}$alkyl, cyclohexyl or cyclohexyl substituted by 1 to 3 $C_{1-4}$alkyls,
  - Rm is $C_{3-9}$alkyl or phenyl,
  - Rn is phenyl or phenyl substituted by cyclohexyl
  - each of Rp and Rq is independently hydrogen, cyclohexyl, $C_{1-4}$alkyl, phenyl or phenyl substituted by 1 or 2 $C_{1-4}$alkyls, with the proviso that when one of Rp and Rq is phenyl or phenyl substituted by 1 or 2 $C_{1-4}$alkyls, the other is other than phenyl or phenyl substituted by 1 or 2 $C_{1-4}$alkyls,
  - Rx is $C_{1-6}$alkyl or $C_{1-6}$chloroalkyl,
  - Ry is tolyl or benzyl, and
  - the two ends of the —(CH$_2$)$_4$— radical are attached to adjacent carbon atoms of Ring A so as to form a fused cyclohexyl ring,
- each $R_3$ is independently chloro or $C_{1-4}$alkyl, and
- n is 0, 1 or 2, with the provisos that (i) n is 0 when $R_2$ is —(CH$_2$)$_4$—, (ii) the total number of carbon atoms in $R_1$ and the substituents or fused cyclohexyl ring on Ring A is 14 to 30 when $R_2$ is $C_{1-12}$alkyl and is otherwise 12 to 30 and (iii) the —SO$_3$H group on Ring B is in the 3- or 4-position.

2. A compound according to claim 1, or a water soluble salt thereof, wherein $R_2$ is —(CH$_2$)$_4$—.

3. A compound according to claim 1, or a water-soluble salt thereof, wherein $R_2$ is —SO$_2$NRpRq.

4. A compound according to claim 1, or a water-soluble salt thereof, wherein $R_2$ is —SO$_3$Rn.

5. A compound according to claim 1, or a water-soluble salt thereof, wherein $R_2$ is —NHCORx.

6. A compound according to claim 1, or a water-soluble salt thereof, wherein $R_2$ is —NHSO$_2$Ry.

7. A compound according to claim 1, or a salt thereof, wherein $R_2$ is —COORm.

8. A compound according to claim 1, or a water-soluble salt thereof, wherein $R_2$ is —NHCOOR or $C_{1-12}$alkyl, with the proviso that the total number of carbon atoms in $R_1$ and the substituents on Ring A is 14 to 30 when $R_2$ is $C_{1-12}$alkyl.

9. A compound according to claim 8, or a water-soluble salt thereof, wherein $R_2$ is $C_{1-12}$alkyl, with the proviso that the total number of carbonn atoms in $R_1$ and the substituents on Ring A is 14 to 30.

10. A compound according to claim 9, or a water-soluble salt thereof, wherein $R_2$ is $C_{1-10}$alkyl.

11. A compound according to claim 9, or a water-soluble salt thereof, wherein said total number of carbon atoms is 18 to 30.

12. A compound according to claim 11, or a water-soluble salt thereof, wherein $R_2$ is $C_{1-10}$alkyl.

13. A compound according to claim 8, or a water-soluble salt thereof, wherein $R_2$ is —NHCOOR.

14. A compound according to claim 13, or a water-soluble salt thereof, wherein each of R and $R_1$ is independently $C_{8-14}$alkyl, cyclohexyl or cyclohexyl substituted by 1 to 3 $C_{1-4}$alkyls.

15. A compound according to claim 13, or a water-soluble salt thereof, with the proviso that the total number of carbon atoms in $R_1$ and the substituents on Ring A is 14 to 30.

16. A compound according to claim 15, or a water-soluble salt thereof, with the proviso that said total number of carbon atoms is 18 to 30.

17. The compound according to claim 2 having the formula

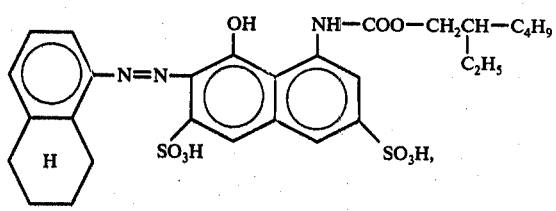

or a water-soluble salt thereof.

18. The compound according to claim 2 having the formula

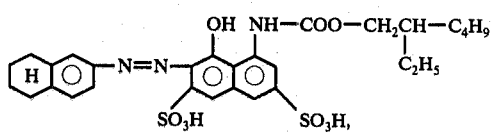

or a water-soluble salt thereof.

19. The compound according to claim 3 having the formula

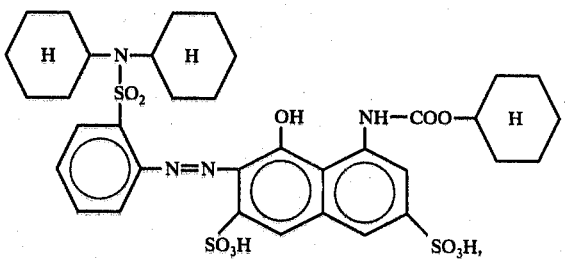

or a water-soluble salt thereof.

20. The compound according to claim 4 having the formula

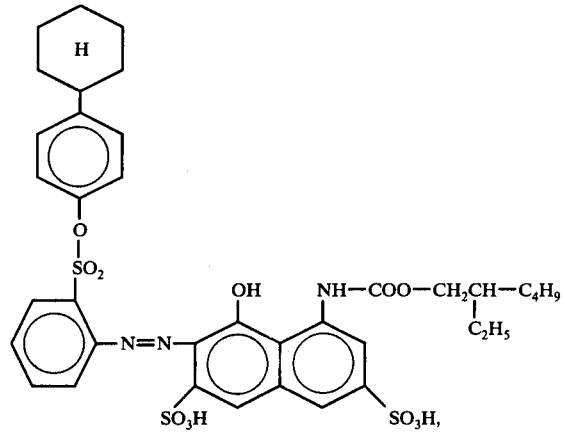

or a water-soluble salt thereof.

21. The compound according to claim 10 having the formula

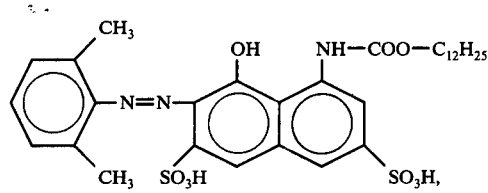

or a water-soluble salt thereof.

22. The compound according to claim 10 having the formula

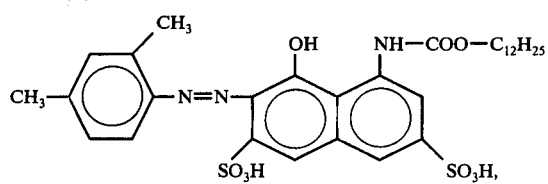

or a water-soluble salt thereof.

23. The compound according to claim 10 having the formula

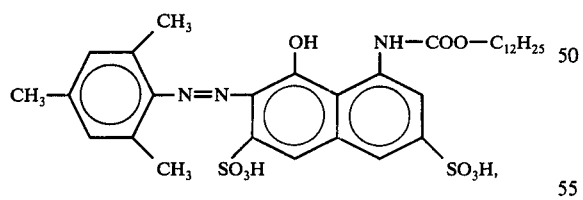

or a water-soluble salt thereof.

24. The compound according to claim 10 having the formula

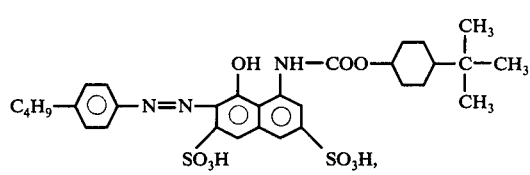

or a water-soluble salt thereof.

25. The compound according to claim 10 having the formula

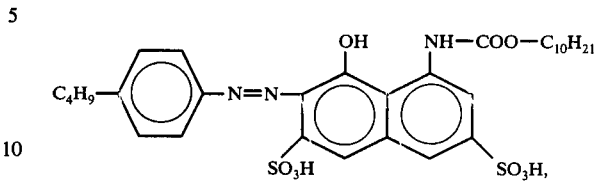

or a water-soluble salt thereof.

26. The compound according to claim 13 having the formula

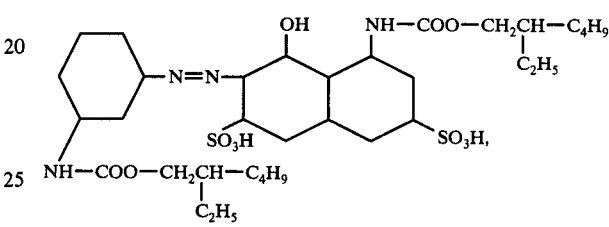

or a water-soluble salt thereof.

27. The compound according to claim 13 having the formula

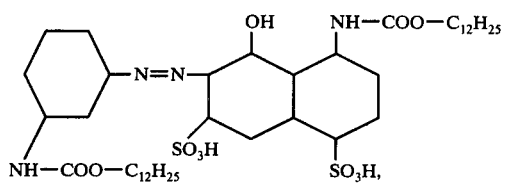

or a water-soluble salt thereof.

28. The compound according to claim 13 having the formula

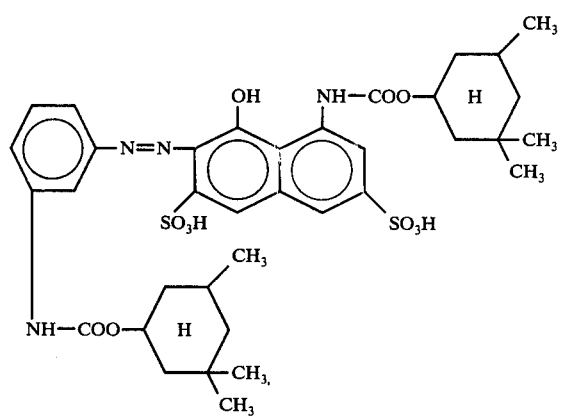

or a water-soluble salt thereof.

29. The compound according to claim 13 having the formula

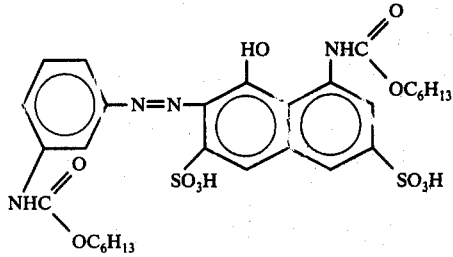

or a water-soluble salt thereof.

30. The compound according to claim 13 having the formula

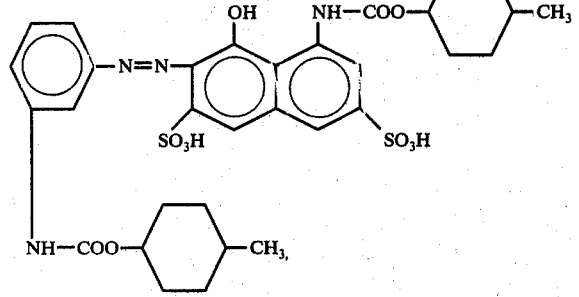

or a water-soluble salt thereof.

31. The compound according to claim 13 having the formula

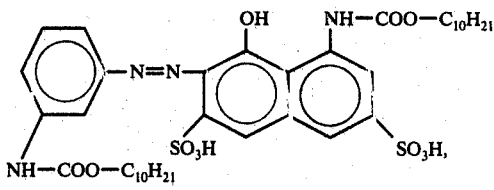

or a water-soluble salt thereof.

32. The compound according to claim 13 having the formula

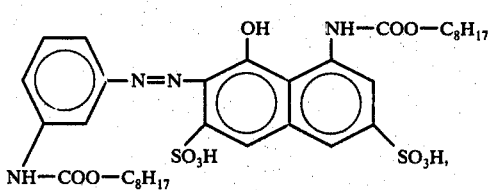

or a water-soluble salt thereof.

33. The compound according to claim 13 having the formula

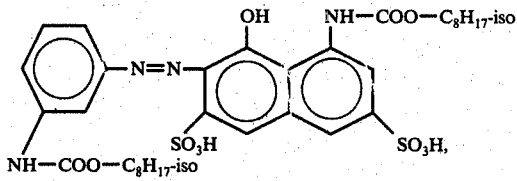

or a water-soluble salt thereof.

34. The compound according to claim 13 having the formula

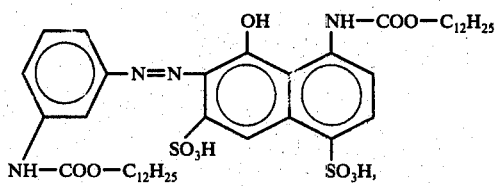

or a water-soluble salt thereof.

* * * * *